UNITED STATES PATENT OFFICE.

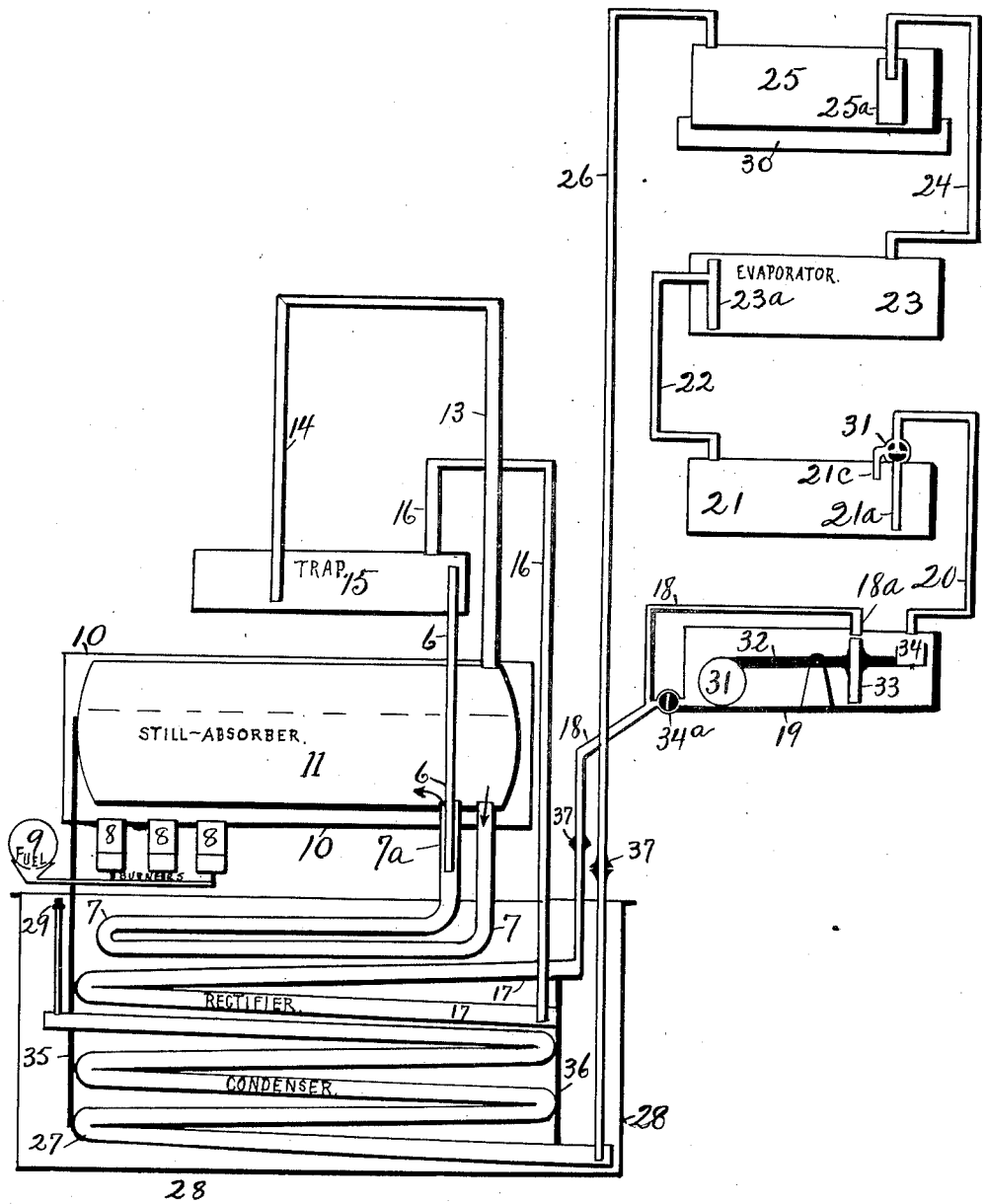

HENRY E. WILLSIE, OF CRANFORD, NEW JERSEY.

REFRIGERATION APPARATUS.

1,364,339.  Specification of Letters Patent.  Patented Jan. 4, 1921.

Application filed March 23, 1917. Serial No. 156,871.

*To all whom it may concern:*

Be it known that I, HENRY E. WILLSIE, a citizen of the United States, and a resident of Cranford, in the county of Union and State of New Jersey, have invented certain new and useful Improvements in Refrigeration Apparatus, of which the following is a specification.

My invention relates to improvements in refrigeration apparatus of the intermittent absorption type; and the objects of my improvements are to simplify the construction and operation to avoid the use of check valves and expansion valves, also the use of running water and to provide a plurality of evaporators.

I attain these objects by the devices shown in the accompanying drawing, in which—

The figure is a vertical, longitudinal diagram of the apparatus.

Similar characters refer to similar parts.

The construction and operation of the apparatus is as follows—

Iron or steel tanks are connected together in the manner shown with iron pipes. Welding of seams and joints is generally employed.

The still-absorber, 11, is filled with aquaammonia to about the level of the dotted line therein. Heat is applied to the still-absorber by the kerosene burners 8, 8, 8 supplied with a fixed quantity of fuel from the reservoir 9. The still-absorber is surrounded by the heat retaining hood 10. Heating the still-absorber drives the ammonia gas and some moisture from the still-absorber through the pipes 13, 14 into the trap 15. This trap also acts as an air cooled rectifier collecting condensed moisture until the excess of moisture overflows through pipe 6 back into the still-absorber.

The partly dried gas passes through pipe 16 into the water cooled rectifier 17 where the gas is more completely dried, the condensed moisture remaining in the rectifier during the heating period. The gas then passes through pipe 18 to the evaporator 19, through pipe 20 to the evaporator 21, through pipe 22 to the evaporator 23, through pipe 24 to the evaporator 25, and through pipe 26 to the bottom of the condenser 27, which is here shown as a coil having its only opening at the bottom. The rectifier 17 and the condenser 27 are submerged in water contained in the water tank 28. By means of a relief valve 29 the condenser may be vented of non-condensable gases. The ammonia gas liquefies in the condenser to an amount determined by the amount of kerosene in the reservoir 9. When the kerosene is all burned there follows a falling pressure in the still-absorber, 11. Then the liquid ammonia in the condenser, 27, flows through the pipe 26 into the evaporator 25. It then flows through the lower end of the sleeve $25^a$, taking with it any moisture that may have been in the evaporator, through the pipe 24 into the evaporator 23, through the lower opening of the T $23^a$, carrying along any moisture in the evaporator; through pipe 22 into evaporator 21.

The liquid flows from evaporator 21 through the pipes $21^c$ and 20 into evaporator 19. The total amount of liquid ammonia has now been about evenly distributed in the four evaporators 19, 21, 23, 25, and the subsequent evaporation produces refrigeration in each of the evaporators. The ammonia gas then passes through pipe 18 and forces moisture collected in the rectifier 17 up pipe 16 into the trap 15. The gas pressure raises a column of liquid in pipe 14 thereby depressing the liquid in pipe 6 until the gas flows from the bottom of the pipe 6 to be absorbed by the liquid in the still-absorber.

The cooling loop 7 is immersed in the water in tank 28 and opens at both ends into the still absorber 11.

The pipe 6 descends for several inches inside one leg, $7^a$, of the cooling loop. By this construction the returning gas sets up a circulation of aqua ammonia from the still-absorber through the cooling loop, thus cooling the aqua ammonia and increasing the rapidity of absorption.

To obtain ice the pan 30 is filled with the water to be frozen. The other evaporators may also have similar pans.

To remove moisture from evaporator 21, the valve 31 is hand turned to close pipe $21^c$ and open pipe $21^a$.

To remove moisture from evaporator 19 a falling float 31 attached to the pivoted lever 32 raises the pipe 33 into contact with pipe 18ª. Moisture may also be drained off by opening the valve 34ª.

When the evaporator 19 is being filled with liquid ammonia, liquid from pipe 20 fills the pan 34 raising the float 31 and lowering the pipe 33. There is a small hole in the bottom of pan 34.

The still-absorber 11, trap 15, cooling loop 7, rectifier 17 and condenser 27 are made as one structural unit to be set into the tank 28; 35, 36 are supports, and 37, 37 are unions.

Any source of intermittent heat may be used, as gas, steam, or electricity.

I claim—

1. In a refrigeration apparatus, the combination of a still absorber, a trap, a cooling tank, a circulating coil connected to the bottom of the still absorber and having a portion immersed in said tank, a connection from the top of said still absorber to the bottom of said trap, a rectifier and a condenser in said tank, a pipe connecting the top of said trap and said rectifier, a pipe connecting the upper part of said trap and one leg of said circulating coil, an evaporator, a pipe connecting said rectifier with the lower part of said evaporator and a pipe connecting the upper part of said evaporator with the lower part of said condenser.

2. In a refrigeration apparatus, the combination of a still-absorber, an evaporator, a condenser, a water cooled rectifier below said still absorber, a rectifier above said still-absorber, all connected in an operative cycle.

3. In a refrigeration apparatus, the combination of a still-absorber, a condenser, an evaporator, all connected in an operative cycle, a cooling loop 7 below the still absorber, and the pipe 6 having one end entering one leg of the cooling loop.

4. In a refrigeration apparatus, the combination of a still-absorber, a condenser, a plurality of evaporators connected in series between the condenser and the still-absorber in an operative cycle, means for flowing the liquefied refrigerant from the condenser into an evaporator, means for retaining a portion of the liquefied refrigerant in said evaporator and means for flowing the remainder of the liquefied refrigerant into another evaporator.

5. In a refrigeration apparatus, the combination of a still-absorber, a condenser, a plurality of evaporators connected at different levels in series between the condenser and the still-absorber, means for flowing the liquid-refrigerant from the condenser into the uppermost evaporator, means for retaining a portion of the liquid refrigerant in the uppermost evaporator and for draining the remainder of the liquefied refrigerant from the uppermost evaporator into the next lower evaporator.

6. In a refrigeration apparatus, the combination of a still-absorber, a condenser, a plurality of evaporators connected at different levels in series between the condenser and the still absorber, all connected in an operative cycle, and means for draining liquid from the bottom of an evaporator into an evaporator at a lower level.

7. In a refrigeration apparatus, the combination of a still-absorber, a condenser, a plurality of evaporators connected at different levels in series between the condenser and the still absorber, and a pipe and a valve for draining liquid from the bottom of one evaporator into an evaporator at a lower level.

8. In a refrigeration apparatus, the combination of a still-absorber, a condenser and an evaporator, all connected in an operative cycle, and a pipe and a valve for draining liquid from the bottom of the evaporator toward the still-absorber, and a float within said evaporator for operating said valve.

9. In a refrigeration apparatus, the combination of a still absorber, a trap, a cooling tank, a circulating coil having a loop in said tank and having its two ends connected to the bottom of said still absorber, a pipe extending from the upper part of said trap into the upper end of one leg of said circulating coil and concentric therewith.

10. Refrigerating apparatus comprising, the combination of a still absorber, a tank below said still absorber, a trap above said still absorber, an evaporator, a pipe connecting the upper part of said still absorber with the lower part of said trap, a circulating coil and a condenser in said tank, a pipe connecting the upper part of said trap with one end of said circulating coil, means of connection between the lower part of said evaporator and the upper part of said trap, and a pipe connecting the lower part of said condenser with the upper part of said evaporator.

11. Refrigerating apparatus comprising, the combination of a still absorber, an evaporator, a cooling tank, a circulating pipe, a rectifier and a condenser in said tank, a trap above said still absorber, means of connection between said still absorber and said trap, means of connection between said trap and said circulating pipe, means of connection between said circulating pipe and said still absorber, means of connection between said rectifier and said trap and between said rectifier and said evaporator, and means of connection between said evaporator and said condenser.

12. In a refrigerating apparatus, a still absorber, a cooling tank, a circulating pipe having its ends connected to the bottom of said still absorber and having a portion submerged in said cooling tank, a trap above said still absorber having a pipe leading from its upper portion into one end of said circulating pipe, a pipe connecting the upper part of said still absorber with the lower part of said trap, and an evaporator and condenser connected to the upper part of said trap.

Signed at New York, in the county of New York and State of New York, this 22nd day of March, A. D. 1917.

HENRY E. WILLSIE.

Witnesses:
E. J. WILLSIE,
A. E. CHIRM.